US009707785B2

(12) United States Patent
Donaldson

(10) Patent No.: US 9,707,785 B2
(45) Date of Patent: Jul. 18, 2017

(54) SYSTEM AND METHOD FOR ANALYSIS OF COMPACT PRINTED TEST PATTERNS

(71) Applicant: Xerox Corporation, Norwalk, CT (US)

(72) Inventor: Patricia J. Donaldson, Pittsford, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 14/801,529

(22) Filed: Jul. 16, 2015

(65) Prior Publication Data

US 2017/0015124 A1 Jan. 19, 2017

(51) Int. Cl.

*B41J 29/393* (2006.01)
*B29C 67/00* (2017.01)
*B41J 2/165* (2006.01)

(52) U.S. Cl.

CPC ......... *B41J 29/393* (2013.01); *B29C 67/0051* (2013.01); *B41J 2/16579* (2013.01); *B41J 2002/1657* (2013.01)

(58) Field of Classification Search

CPC ........ B41J 2/2142; B41J 2/2146; G06K 9/036
See application file for complete search history.

(56) References Cited

U.S. PATENT DOCUMENTS 5,860,679 A * 1/1999 Fukuda et al. .................. 283/70
6,707,579 B1 * 3/2004 Komiya et al. ................ 358/3.1
6,989,115 B2 1/2006 Russell et al.
7,372,555 B2 5/2008 Watanabe
7,747,341 B2 6/2010 Dubois et al.
8,506,038 B2 8/2013 Mizes et al.
8,602,518 B2 12/2013 Mizes et al.
2002/0021325 A1* 2/2002 Koitabashi ........... B41J 2/16579 347/43
2002/0089561 A1 7/2002 Weitzel et al.
2006/0111807 A1 5/2006 Gothait et al.
2007/0296791 A1* 12/2007 Eve ...................... B41J 11/0085 347/104
2009/0015621 A1* 1/2009 Hirota et al. ................... 347/19
2009/0085952 A1* 4/2009 Yamazaki ....................... 347/19
2009/0167817 A1 7/2009 Orr
2010/0303281 A1* 12/2010 Wu et al. ....................... 382/100
2011/0242187 A1* 10/2011 Mongeon et al. .............. 347/19
2011/0279505 A1* 11/2011 Shin et al. ...................... 347/14

FOREIGN PATENT DOCUMENTS

EP 2 042 324 A2 4/2009
WO 2006/034012 A2 3/2006

OTHER PUBLICATIONS

Gibson et al.; Additive Manufacturing Technologies: Rapid Prototyping to Direct Digital Manufacturing; 2010; pp. 195-198 and p. 201; Springer Science + Business Media, LLC; 2010.

* cited by examiner

*Primary Examiner* — Stephen Meier
*Assistant Examiner* — John P Zimmermann
(74) *Attorney, Agent, or Firm* — Maginot Moore & Beck LLP

(57) ABSTRACT

A method of identifying inoperable ejectors in a printhead includes operating a plurality of ejectors in the printhead to form a printed test pattern on an image receiving surface while the printhead and image receiving surface remain stationary. The method also includes generating image data of the printed test pattern, identifying rows of marks in the printed test pattern, and identifying an inoperable ejector in the printhead that corresponds to a missing mark in one row of marks that corresponds to one ejector in a row of ejectors in the printhead.

20 Claims, 6 Drawing Sheets

SYSTEM AND METHOD FOR ANALYSIS OF COMPACT PRINTED TEST PATTERNS

TECHNICAL FIELD

This disclosure is directed to inkjet printing systems and, more particularly, to systems and methods of image analysis of compact printed test patterns from one or more printheads in an inkjet printer.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use inkjet printing, where one or more printheads eject successive layers of material. Three-dimensional printing is distinguishable from traditional object-forming techniques, which mostly rely on the removal of material from a work piece by a subtractive process, such as cutting or drilling.

Some three-dimensional printers operate one or more printheads to form three-dimensional printed objects. Each printhead includes a plurality of ejectors that emit drops of one or more build materials to form a three-dimensional printed object on a layer-by-layer basis. During operation, some of the ejectors in the printhead may become clogged or otherwise fail to operate in a reliable manner. The printer moves the printhead to a maintenance station to perform printhead cleaning, purging, or other maintenance operations to return the ejectors to operation. In some embodiments, the printer operates the printhead to form a predetermined test pattern. The printer generates image data of the test pattern to identify inoperable ejectors to determine if a maintenance operation is necessary.

In many three-dimensional printers, the printhead forms printed test patterns on a surface of a print medium, such as a roll of metalized Mylar film, thermal paper, or another type of printing paper. The print medium roll is replaced after multiple printhead test pattern formation operations, and the print medium roll is one consumable item in the printer that contributes to the cost and operation of the printer. Additionally, many types of build material that are used in three-dimensional object printers are optically translucent or otherwise have a low contrast that reduces the effectiveness in detection of printed marks in the test pattern. Consequently, improved systems and methods for printhead maintenance that reduce the consumption of a print medium and improve the accuracy of test pattern analysis would be beneficial.

SUMMARY

In one embodiment, a method of analyzing a compact test pattern to identify inoperable ejectors in a printhead has been developed. The method includes operating with a controller a plurality of ejectors in a printhead to eject drops of a marking agent onto an image receiving surface to form a plurality of marks in a printed test pattern, the printhead and image receiving surface being held in a stationary position with reference to each other during operation of the plurality of ejectors, operating with the controller an optical sensor to generate image data of the plurality of marks in the printed test pattern on the image receiving surface, identifying with the controller a plurality of candidate mark locations in the image data, identifying with the controller a row of printed marks in the image data with reference to a linear arrangement of a portion of the plurality of candidate mark locations, the linear arrangement corresponding to a single row of ejectors in the plurality of ejectors in the printhead, identifying with the controller an inoperable ejector in the row of ejectors in the printhead in response to an expected location of a mark from the inoperable ejector located along the linear arrangement in the image data not corresponding to any of the identified printed marks, and operating with the controller a printhead maintenance unit in response to identification of the inoperable ejector.

In another embodiment, an inkjet printer that analyzes a compact test pattern to identify inoperable ejectors in a printhead has been developed. The inkjet printer includes a printhead including a plurality of ejectors configured to eject drops of a marking agent onto an image receiving surface, an optical sensor configured to generate image data of the image receiving surface, a printhead maintenance unit, and a controller operatively connected to the printhead, the optical sensor, and the printhead maintenance unit. The controller is configured to operate the plurality of ejectors to eject drops of the marking agent onto the image receiving surface to form a plurality of marks in a printed test pattern, the printhead and image receiving surface being held in a stationary position with reference to each other during operation of the plurality of ejectors, operate the optical sensor to generate image data of the plurality of marks in the printed test pattern on the image receiving surface, identify a plurality of candidate mark locations in the image data, identify a row of printed marks in the in the image data with reference to a linear arrangement of a portion of the plurality of candidate mark locations, the linear arrangement corresponding to a single row of ejectors in the plurality of ejectors in the printhead, identify an inoperable ejector in the row of ejectors in the printhead in response to an expected location of a mark from the inoperable ejector located along the linear arrangement in the image data not corresponding to any of the identified printed marks, and operate the printhead maintenance unit in response to identification of the inoperable ejector.

BRIEF DESCRIPTION OF THE DRAWINGS

The foregoing aspects and other features of an apparatus or printer that analyzes compact printed test patterns are explained in the following description, taken in connection with the accompanying drawings.

DETAILED DESCRIPTION

Figure 1:
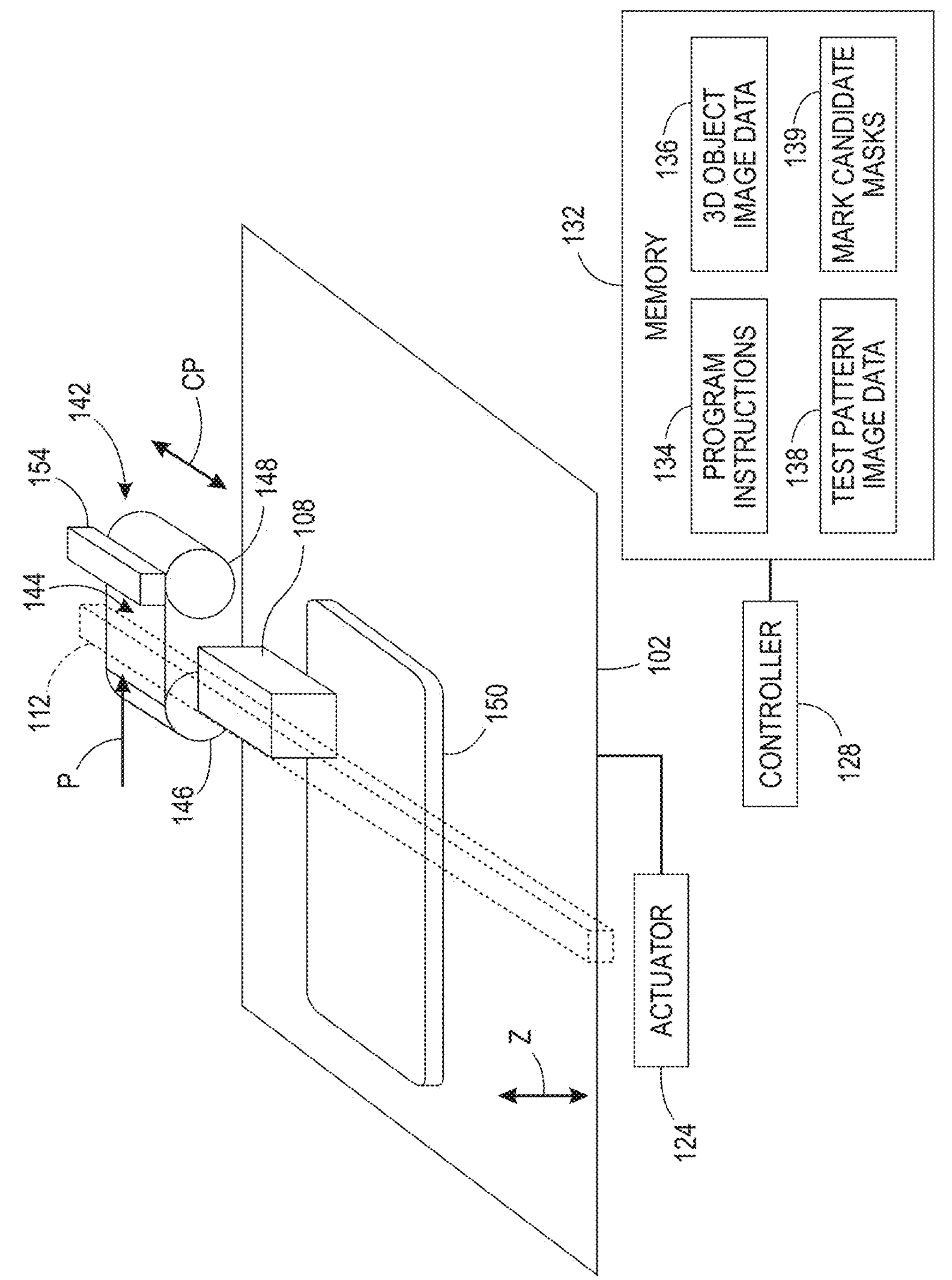
FIG. 1 is a diagram of a three-dimensional object printer.

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in a printhead and subsequently hardened into a solid material that forms an object through an additive three-dimensional object printing process. Some three-dimensional object printer embodiments employ multiple forms of build material to produce an object. In some embodiments, different build materials with varying physical or chemical characteristics form a single object.

As used herein, the term "support material" refers to a form of material used in a three-dimensional object printer to support portions of a three-dimensional object during the printing process, but the support material does not form a permanent part of the three-dimensional printed object. Examples of support material include waxes that a printhead ejects to form a solid layer to support structures formed from the build material as the three-dimensional object printer forms successive layers of an object. After completion of the three-dimensional object printing operation, the support material is removed from the three-dimensional object leaving the structure formed by the build material intact.

As used herein, the term "marking agent" refers to a material that an inkjet printhead in a printer ejects onto an image receiving surface, such as a support member, a surface of a partially formed three-dimensional printed object, or a print medium. The build materials and support materials used in three-dimensional object printers are examples of marking agents. Additional examples include, but are not limited to, phase-change inks, aqueous inks, solvent-based inks, and the like.

As used herein, the term "process direction" refers to a direction of movement of an image receiving surface past a printhead. As described below, in one embodiment the image receiving surface and printhead remain stationary relative to each other as the printhead forms a compact printed test pattern on the image receiving surface. The image receiving surface then moves in the process direction past an optical sensor to enable the printer to produce image data of the compact printed test pattern. In some embodiments, an elongated roll of metalized Mylar, thermal paper, or another suitable paper print medium provides the image receiving surface. As used herein, the term "cross-process direction" refers to a direction that is perpendicular to the process direction on the image receiving surface.

As used herein, the term "test pattern" refers to a predetermined arrangement of printed marks that a plurality of ejectors in a printhead form on an image receiving surface. In some embodiments, a "compact test pattern" refers to a test pattern formed from marks that cover a region of the image receiving surface that is not substantially larger than the physical footprint of the corresponding ejectors in the printhead. In some embodiments, the compact test pattern occupies a region that is substantially equal to the footprint of the ejectors in the printhead. For example, as described in more detail below, the printhead and image receiving surface remain substantially stationary relative to each other and each ejector in the printhead ejects at least one drop of marking agent onto the image receiving surface in one embodiment. The printhead forms a compact test pattern that includes a set of marks arranged in a pattern that corresponds to the physical arrangement of ejectors in the printhead. The printhead ejects individual drops of the marking agent that form marks with a circular shape in the test pattern.

As used herein, the terms "linear" and "linear arrangement" refer to an expected set of locations for a row of ejectors in a printhead and corresponding printed marks in a test pattern that are approximately parallel to a predetermined axis. The linear arrangement enables a digital controller to identify sets of marks that are arranged along the axis line with predetermined separation between the marks corresponding to the predetermined separation between ejectors in a row of ejectors in the printhead. A digital controller identifies the locations of three or more marks in the linear arrangement in image data of the test pattern and continues to process image data in a linear region of the test pattern to identify other marks that belong to the row of ejectors in the printhead. The controller also identifies locations that do not include a mark corresponding to an inoperable ejector in the printhead. As described in more detail below, the linear arrangement of marks do not have to lie on a perfectly straight line in a strictly geometric sense, but instead the marks are located within a predetermined threshold distance from expected marks locations in the two-dimensional image data based on the arrangement of ejectors in the printhead.

FIG. 1 depicts a three-dimensional object printer 100 that is configured to operate a printhead to form a three-dimensional printed object 150. The printer 100 includes a support member 102, printhead 108, printhead arm 112, controller 128, memory 132, and printhead maintenance unit 142. In the illustrative embodiment of FIG. 1, the three-dimensional object printer 100 is depicted during formation of a three-dimensional printed object 150 that is formed from a plurality of layers of a build material.

The support member 102 is a planar member, such as a metal plate, that supports the three-dimensional printed object 150 during the printing process. In one embodiment, the member 102 carries any previously formed layers of build material through the print zone 120 in the process direction P, and the support member 102 follows a carousel path or moves in a reciprocating motion to move through the print zone for multiple passes past the printhead 108 to form the three-dimensional printed object 150. In another embodiment, the support member 102 remains stationary along the process direction axis P during the printing operation and the printhead arm 112 moves the printhead 108 in a rasterized motion along both the cross-process direction CP and process direction P to form each layer of the three-dimensional printed object. In the embodiment of FIG. 1, an actuator 124 also moves the support member 102 in the direction Z away from the printhead 108 after application of each layer of build material to ensure that the printhead 108 maintains a predetermined distance from the upper surface of the object 150.

The printhead 108 includes a plurality of ejectors that receive one or more marking agents in a liquefied form and eject liquid drops of the build material. In one embodiment, each ejector includes a fluid pressure chamber that receives the liquid build material, an actuator such as a piezoelectric actuator, and an outlet nozzle. The piezoelectric actuator deforms in response to an electric firing signal and urges the liquefied build material through the nozzle as a drop that is ejected toward the member 102. If the member 102 bears previously formed layers of a three-dimensional object, then the ejected drops of the build material form an additional layer of the object. When the printhead arm 112 moves the printhead 108 over the image receiving surface of the roll 144, the ejectors in the printhead 108 eject drops of the marking agent onto the image receiving surface 144. The printhead 108 includes a two-dimensional array of the ejectors, with an exemplary printhead embodiment including 880 ejectors. During operation, the controller 128 controls the generation of the electrical firing signals to operate selected ejectors at different times to form each layer of the build material for the object 150 with reference to the 3D object image data 136. The controller 128 also operates the ejectors with reference to the compact test pattern image data 138 to form the compact test pattern on the roll 144.

While FIG. 1 depicts a single printhead 108 that ejects drops of a build material marking agent, alternative printer configurations include multiple printheads that eject one or more types of marking agent. Additionally, in some embodiments a single printhead ejects different types of marking agent from multiple sets of ejectors in the printhead. As described below, printheads typically include two-dimensional arrays of ejectors that are grouped into rows. In some embodiments, one or more sets of ejector rows eject different types of marking agent onto the image receiving surface. In some printhead embodiments, different sets of ejectors also eject the marking agent with different drop sizes that form marks with varying sizes in a test patter. For example, in one embodiment a printhead ejects drops of a build material from a first set of ejectors and drops of a phase-change ink from a second set of ejectors. The drops of the build material that form the structure of a three-dimensional printed object are larger than the drops of the phase-change ink that the printer uses to form printed text and images on a surface of the three-dimensional object.

The printhead arm 112 includes a support member and one or more actuators that move the printhead 108 during printing and maintenance operations. The printhead arm 112 moves the printhead 108 in a reciprocating motion along the cross-process direction CP during a printing operation. The ejectors in the printhead 108 eject drops of a build material and other materials onto portions of the object 150 as the printhead 108 moves across the object 108. In one embodiment, an actuator that is operatively connected to the printhead arm 112 moves the printhead arm 112 in the process direction P to enable the printhead 108 to move in both the cross-process and process directions during the printing operation. The printhead arm 112 also extends to the printhead maintenance unit 142. During a maintenance operation, the printhead arm 112 moves the printhead 108 to the printhead maintenance unit 142 to position the plurality of ejectors in the printhead 108 over the image receiving surface of the print medium roll 144. As described below, the printhead 108 forms compact printed test patterns on the image receiving surface of the roll 144.

In the printer 100, the printhead maintenance unit 142 includes a print medium roll 144, and an optical sensor 154. In some embodiments the printhead maintenance unit 142 also includes a printhead cleaning device or other maintenance hardware (not shown) that perform maintenance operations to clean the printhead 108 and maintain operation of the ejectors in the printhead 108. The print medium roll 144 is an elongated roll of metallized Mylar, paper, or another suitable material to receive printed marks from the ejectors in the printhead 108. In the illustrative example of FIG. 1, the print medium roll 144 is mounted to a supply spool 146 and an uptake spool 148. The region of the roll 144 between the supply spool 146 and the uptake spool 148 forms an image receiving surface for a compact test pattern from the printhead 108. During operation, the printhead 108 ejects drops of marking agent onto the roll 144 to form a compact printed test pattern. An actuator in the printhead maintenance unit 142 moves the roll 144 and printed test pattern past the optical sensor 154 in the process direction P. The optical sensor 154 includes an array of sensing elements that are arranged along the cross-process direction CP to generate scanlines of pixels. The optical sensor 154 generates a series of the pixel scanlines as the printed test pattern on the roll 144 moves past the optical sensor 154 to generate two-dimensional image data of the image receiving surface and the printed test pattern. In another embodiment, a two-dimensional optical sensor generates the image data as a single two-dimensional image that includes the marks in the compact printed test pattern.

As described above, the printhead 108 forms a compact test pattern on the image receiving surface of the print medium roll 144. The compact test pattern includes an array of printed marks that correspond to the ejector layout in the printhead 108 while the print medium roll 144 and the printhead 108 remain stationary relative to each other. The area of the compact test pattern on the roll 144 corresponds to the area of the two-dimensional array of ejectors in the printhead 108. Thus, the compact test pattern takes up a comparatively small portion of the roll 144 compared to existing test patterns that are formed by a larger array of marks over larger regions of the image receiving surface, and the printer 100 consumes the print medium roll 144 at a lower rate compared to prior art printers. The controller 128 moves the print medium roll 144 past the optical sensor 154 to produce image data after the printhead 108 has formed the compact test pattern on the surface of the print medium roll 144.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102, the printhead arm 112, and the movement of the roll 144 from the supply spindle 146 to the uptake spindle 148. The controller 128 is also operatively connected to the printhead 108 to control operation of the plurality of ejectors in the printhead 108.

The controller 128 is also operatively connected to a memory 132. In the embodiment of the printer 100, the memory 132 includes volatile data storage devices such as random access memory (RAM) devices and non-volatile data storage devices such as solid-state data storage devices, magnetic disks, optical disks, or any other suitable data storage devices. The memory 132 stores programmed instruction data 134, three-dimensional (3D) object image data 136, test pattern image data 138 that correspond to a compact test pattern, and mask image data 139 that correspond to an expected size and shape of one or more marks in the compact test pattern. The controller 128 executes the stored program instructions 134 to operate the components in the printer 100 to both form the three-dimensional printed object 150 and print two-dimensional images on one or more surfaces of the object 150. The 3D object image data 136 includes, for example, a plurality of two-dimensional image data patterns that correspond to each layer of build material and optionally support material that the printer 100 forms during the three-dimensional object printing process. The controller 128 ejects drops of the build material from the printhead 108 with reference to each set of two-dimensional image data to form each layer of the object 150. The memory 132 also stores test pattern image data 138 corresponding to a compact printed test pattern that the printhead 108 forms on the surface of the roll 144 when the printhead arm 112 moves the printhead 108 to the printhead maintenance unit 142.

During operation, the controller 128 operates the ejectors in the printhead 108 to form the three-dimensional printed object 150. The controller 128 operates the printhead arm 108 to move the printhead 108 in a reciprocating motion along the cross-process direction CP and to move the printhead arm 112 and printhead 108 along the process direction P for multiple passes over the three-dimensional printed object 150. During each pass, the controller 128 operates the ejectors in the printhead 108 to form another layer of the object 150 from ejected drops of the build material with reference to a corresponding image in the three-dimensional object image data 136. In some embodiments the printhead 108 or another printhead in the printer 100 forms portions of the layer from a support material or ejects drops of an ink marking agent to form a printed image on a surface of the object 150.

During a maintenance procedure, the controller 128 operates the arm 112 to move the printhead 108 into the printhead maintenance unit 142 over the surface of the media roll 144. As described in more detail below, the controller 128 operates the ejectors in the printhead 108 to eject drops of marking agent onto the image receiving surface of the roll 144 while the printhead 108 and roll 144 remain stationary relative to each other. The ejected pattern of drops forms a compact test pattern that occupies a region of the roll 144 of approximately the same size as the array of ejectors in the printhead 108. The controller 128 then operates an actuator to move the roll 144 and compact test pattern past the optical sensor 154 to produce image data of the compact test pattern. The controller 128 identifies inoperable ejectors in the printhead 108 and performs printhead maintenance activities if needed to return the inoperable ejectors to operation.

Figure 2:
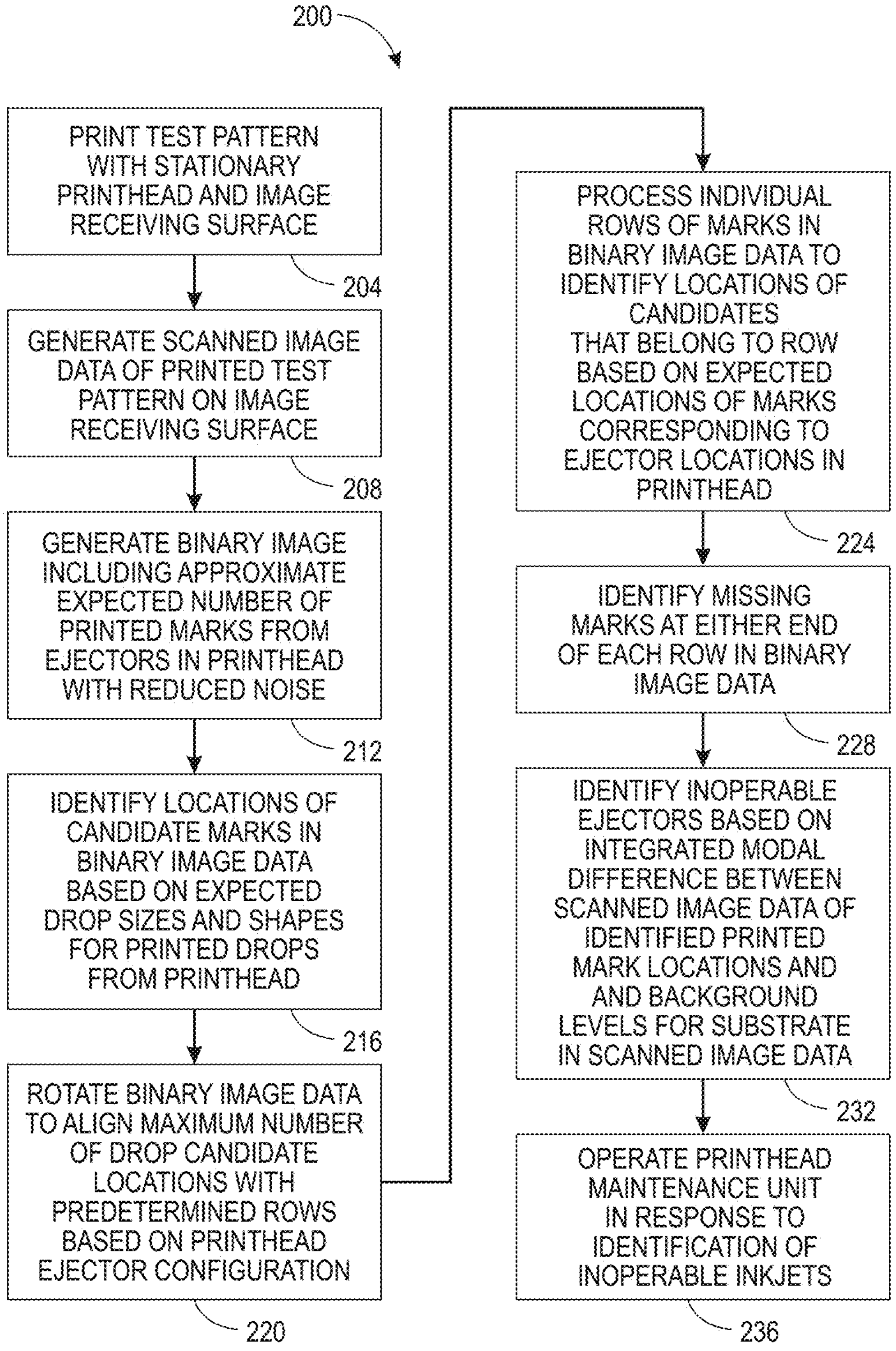
FIG. 2 is a block diagram of a process for identifying inoperable ejectors in a printhead with reference to image data of a compact test pattern.

FIG. 2 depicts a process 200 for printing a compact test pattern with a printhead in an inkjet printer and identifying inoperable ejectors in the printhead with reference to image data of the compact test pattern. In the description below, a reference to the process 200 performing an action or function refers to the operation of a controller, such as the controller 128, to execute stored program instructions to perform the function or action in association with other components in an inkjet printer. The process 200 is described in conjunction with the printer 100 of FIG. 1 for illustrative purposes.

Process 200 begins as the printhead ejects drops of the marking agent onto the image receiving surface to form a compact printed test pattern (block 204). In the printer 100, the controller 128 operates the printhead arm 128 to move the printhead 108 into position in the printhead maintenance unit 142. The controller 128 generates firing signals to operate the ejectors in the printhead 108 while the printhead 108 and image receiving surface of the print medium roll 144 remain stationary relative to one another. During operation, each ejector emits at least one drop of the marking agent to form a corresponding printed mark on the image receiving surface. In some embodiments, the controller 128 operates each ejector more than once to form marks using multiple drops of the marking agent. As described above, some of the ejectors in the printhead may be inoperable, and may either fail to eject drops in a consistent manner or eject drops onto an incorrect location in the printed test pattern.

Process 200 continues as the printer 100 generates image data of the compact printed test pattern on the surface of the print medium roll 144 (block 208). The controller 128 operates an actuator in the printhead maintenance unit 142 to move the portion of the print medium roll 144 that includes the printed test pattern in the process direction P past the optical sensor 154. The optical sensor 154 generates a two-dimensional array of image data including both the surface of the roll 144 and the printed marks that are formed on the roll 144. In the printer 100, the optical sensor 154 generates image data on an 8-bit gray scale in which each pixel of image data is assigned a numeric reflectance value of 0 (least reflection) to 255 (greatest reflection). In many printed test patterns, the underlying image receiving surface has a higher reflectance level than the printed marks that are formed on the image receiving surface. Alternative optical sensor embodiments generate image data using a different scale and optionally generate grayscale or multicolor image data. The controller 128 receives the image data and analyzes the image data to locate marks in the test pattern that correspond to rows of ejectors in the printhead 108 and to identify inoperable ejectors.

Figure 3A:
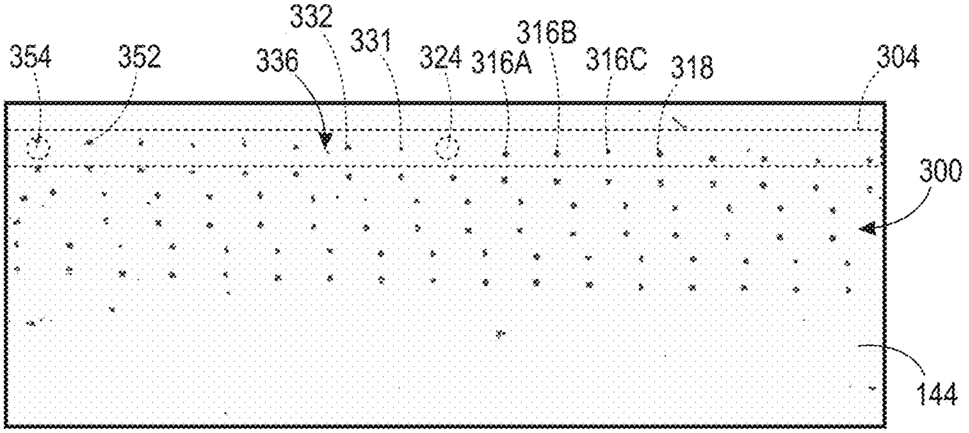
FIG. 3A is a depiction of image data including a compact test pattern.

FIG. 3A depicts image data of an exemplary compact test pattern on a print medium. In FIG. 3A, the image data includes a region of the surface of the roll 144 including a plurality of marks that the plurality of ejectors in the printhead 108 form in a compact test pattern 300. The arrangement of marks in the test pattern 300 includes a plurality of rows of marks that correspond to rows of ejectors that are formed in the printhead 108. In FIG. 3A, a row 304 includes a series of marks formed in a linear arrangement corresponding to a linear arrangement of ejectors in the printhead. The marks in the row 304 include marks 316A, 316B, 316C, 318, 331, 332, and 352. As depicted in FIG. 3A, the location 324 corresponds to an expected location of a printed mark from an ejector in the printhead 108, but the corresponding ejector is inoperable and the location 324 does not include a printed mark. The image data also include contaminants on the image receiving surface and other image artifacts that produce optical noise in the image data. Many of the marks from noise lie outside of the rows in the test pattern 300, but some noise elements lie within a row of marks, such as the contaminant 336 that is within the row 304.

Referring again to FIG. 2, the process 200 continues as the controller 128 generates binary image data from the image data of the compact test pattern using an image data threshold value (block 212). The binary image data includes a two-dimensional array of pixels that correspond to image data, but the binary image data includes only two values with one value (e.g. 0) representing the background image receiving surface and the other value (e.g. 1) representing a potential location of marking agent in the printed test pattern. In one embodiment, the controller 128 selects a threshold with reference to a histogram or other suitable distribution of reflectance values in the image data. For example, in one embodiment a printhead generates printed marks in the test pattern that cover approximately 0.5% of the region of the image data. In one embodiment, the proportion of the region of the image receiving surface that is covered with the marking agent is determined empirically and may vary based on the configuration of ejectors in different printheads.

Figure 5:
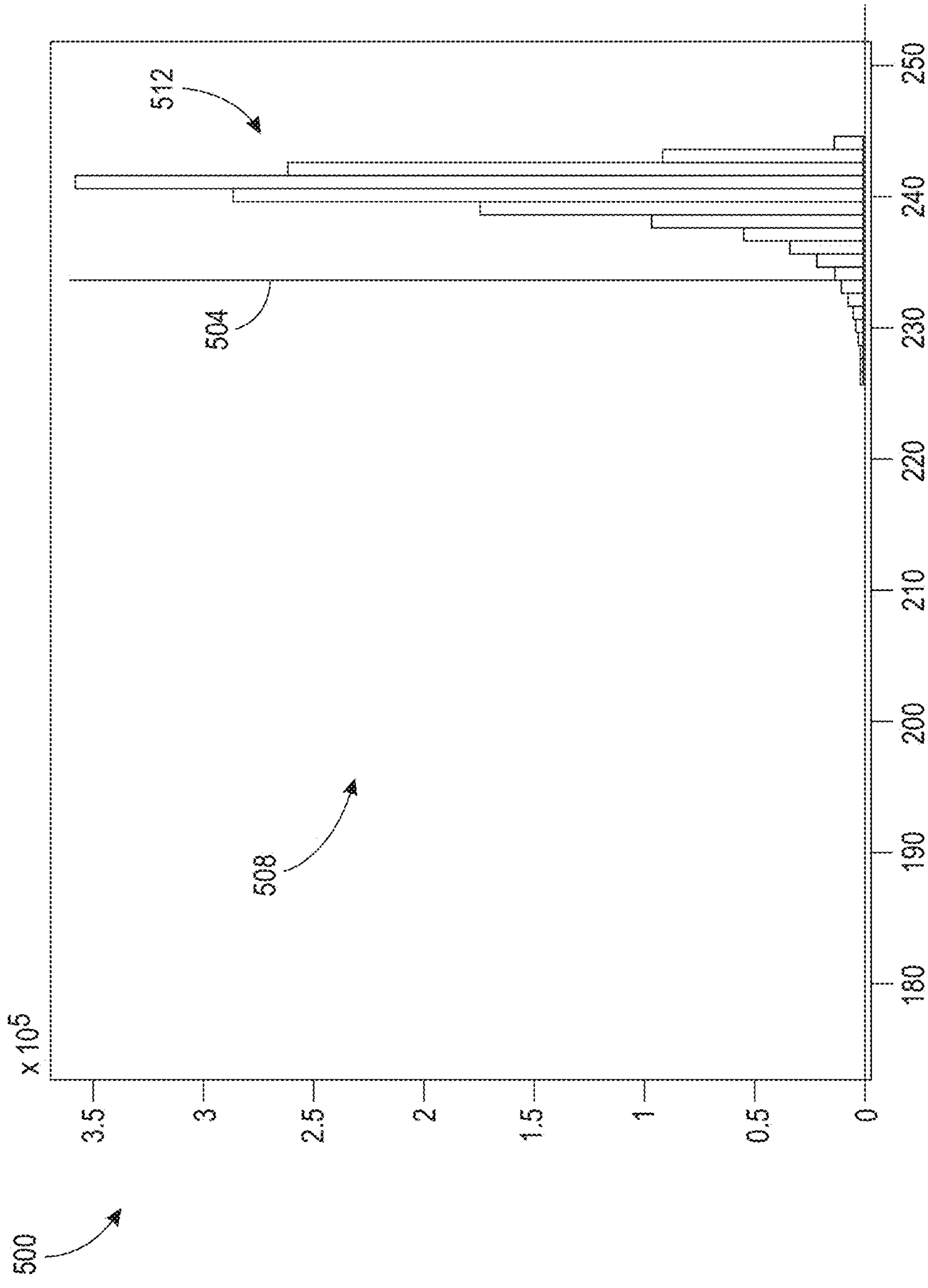
FIG. 5 is a histogram depicting a distribution of reflectance values in image data of a compact test pattern and an image receiving surface.

In the printed test pattern, each printed mark has an expected range of reflectance values that the controller 128 receives in image data from the optical sensor 154. The controller 128 selects a threshold that produces binary image data with one predetermined proportion of the pixels corresponding to the image receiving member and another predetermined proportion of the pixels corresponding to the printed marks in the test pattern. For example, FIG. 5 depicts a histogram 500 of reflectance values in the image data. Reflectance values that are closer to zero correspond to printed marks in the test pattern and potentially to contaminants and other visual artifacts in the printed test pattern. The controller 128 identifies the threshold 504 based on the distribution of the reflectance values in the histogram 500 with a first proportion of the histogram values 508 being assigned a binary value corresponding to a printed mark and the remaining proportion 512 being assigned a binary value corresponding to the background image receiving surface.

The printer 100 generates the binary image data to improve the accuracy of identifying candidate drop locations in the printed test pattern with reduced image noise. In embodiments where a low-contrast marking agent such as a transparent or translucent build material forms the printed test pattern, the controller 128 generates the binary data to distinguish between the locations of printed marks and noise in the image data with a greater degree of accuracy compared to the grayscale image data. However, in some embodiments the controller 128 performs the processing described below using the image data without generating the binary image data. For example, a printhead that ejects drops of a high-contrast marking agent, such as black ink, onto a relatively low-noise image receiving member such as white paper produces a printed test pattern with a high contrast ratio and low level of optical noise. In the alternative embodiment, the controller 128 or other suitable controller identifies candidate mark locations in image data and continues with the process 200 without generating the binary image data.

The effects of image noise and potential missing ejectors often produce binary image data including a different number of candidate mark locations compared to the number of ejectors in the printhead. The number of candidate mark locations approximates the total number of ejectors in the printhead. In some embodiments of the process 200, if the total number of identified candidate mark locations differs from the expected number of marks in the compact test pattern by a large margin then the controller 128 adjusts the threshold level, generates a new set of binary image data using the new threshold, and repeats the candidate mark location identification process. For example, in one configuration the controller 128 adjusts the threshold and repeats the candidate mark location identification process if the candidate mark numbers differ from the expected number of marks by more than ±10%. If the number of candidate marks is too low, the controller 128 reduces the threshold level to generate more foreground pixels in the binary image data, and if the number of candidate marks is too high, the controller 128 increases the threshold level to generate fewer foreground pixels in the binary image data. The controller 128 repeats the process in an iterative manner until the binary image data includes a number of candidate marks that is within a predetermined threshold of the expected number of marks in the printed test pattern.

Figure 3B:
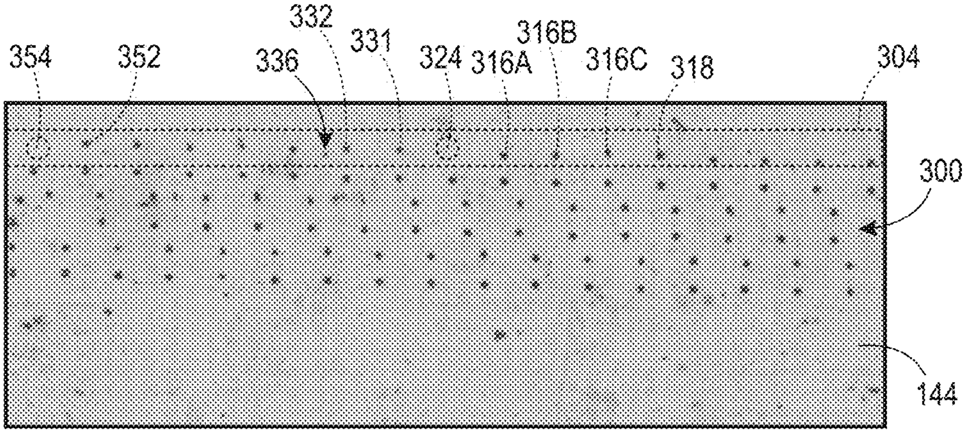
FIG. 3B is a depiction of binary image data formed from the image data of FIG. 3A

FIG. 3B depicts binary image data of the test pattern 300 that corresponds to the image data in FIG. 3A. As depicted in FIG. 3B, pixels in the image data that are below a predetermined reflectance threshold value are assigned a first binary image data value and the remaining pixels with a reflectance value above the predetermined threshold as assigned a second binary image data value. FIG. 3B depicts the pixels that fall below the threshold in black and the remaining pixels that are above the threshold in white for illustrative purposes. FIG. 3B includes binary image data of the test pattern 300 including the row 304 with the marks 316A-316C, 318, 331, 332, and 352. In the binary image data, the gap 324 corresponds to the predetermined location of a missing mark from an inoperable ejector, and the mark 336 corresponds to the artifact in the image data of the test pattern 300.

Referring again to FIG. 2, process 200 continues as the controller 128 identifies the locations of mark candidates in the binary image data (block 216). In the printer 100, the controller 128 identifies mark locations using one or more predetermined image masks that correspond to an expected size and shape of a printed mark in the test pattern. In the printer 100, each ejector in the printhead 108 ejects approximately spherical drops of material that form approximately circular marks on the image receiving surface. The controller 128 retrieves one or more mark candidate mask patterns 139 from the memory 132 and performs a convolution or other suitable image comparison process to identify the locations of mark candidates in the binary image data.

Figures 4A, 4B:
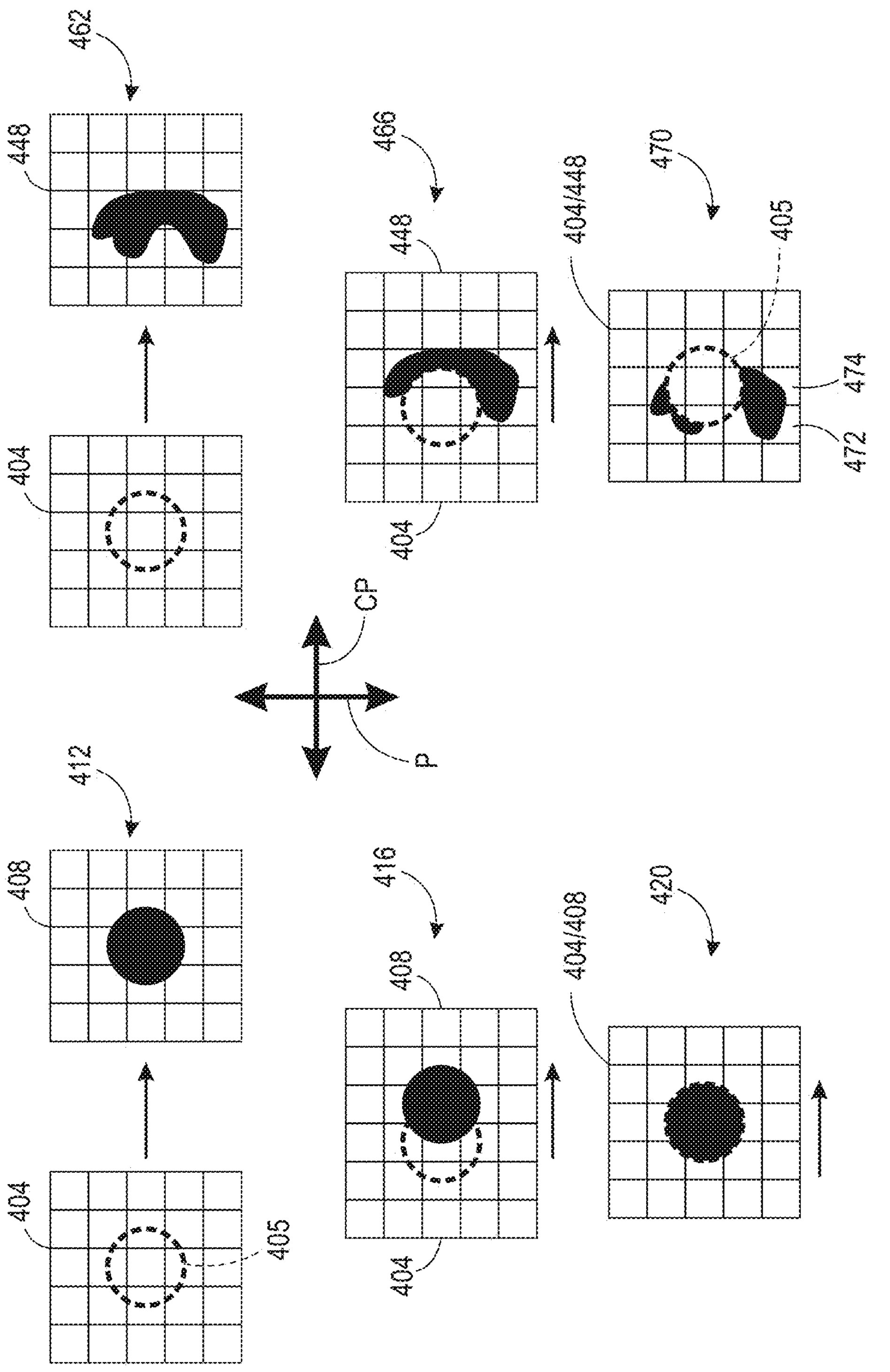
FIG. 4A is a diagram depicting an operation to identify a candidate mark location with a mask corresponding to the size and shape of a printed mark in the compact test pattern.
FIG. 4B is a diagram depicting an operation to identify that an image artifact does not correspond to a candidate mark location with the mask.

FIG. 4A and FIG. 4B depict a mask 404 and a corresponding region of the binary image data 408 that includes a printed mark 408. The mask 404 includes pixels with reflectance values that correspond to circular mark 405 that one or more drops of the marking agent form in a printed test pattern. The size of the mark 405 in the mask 404 extends to more than one pixel including one pixel at the center of the mark, an arrangement of pixels around the central pixel that correspond to the periphery of the printed mark, and an outer set of pixels that do not include any of the marking agent. Thus, the mask 404 corresponds to both the size and shape of an expected printed mark in the test pattern 300. In alternative embodiments, the mask includes a different size and shape based on the expected configuration of printed marks in a test pattern, and in some embodiments, the memory 132 stores multiple mark masks 139 that correspond to different sizes and shapes of marks for printheads embodiments that emit multiple drop sizes. The controller 128 applies multiple masks to the image data to identify candidate mark locations for marks of different sizes.

During the process 200, the controller 128 translates the mask across the binary image data along both the cross-process direction CP and the process direction P. As depicted in FIG. 4A, in configuration 412 the controller 128 moves the mask 404 toward a region of the binary image data 408 that includes a printed mark in the test pattern. The mask 404 and the region 408 partially overlap in configuration 416, and the mask 404 and the printed mark 408 overlap with a maximum degree of similarity between the mask and binary image data in configuration 420. In one configuration, the controller 128 identifies the location of the mark candidate with reference to a local maximum of similarity between the mask 404 and the printed mark in the region 408 to identify one candidate mark location and to reduce the likelihood of misidentifying the mark location based on partial overlap between the mask and the mark. Regions of the image receiving surface that do not include printed marks or other pixels that differ from the background image receiving surface do not match the mask 404.

During the candidate mark identification process, controller 128 identifies not only a similarity between the regions of the image data that include a printed mark, but also the region around the mark that should correspond to the image receiving surface. For example, in FIG. 4B the controller 128 moves the mask 404 toward a region of the binary image data 448 that includes a contaminant on the image receiving surface. In the configuration 462, the mask 404 approaches the region 448. In the configuration 466, the mask 404 partially overlaps the contaminant in the region 448. In the configuration 470, the mask 404 has maximum overlap with the contaminant 448. While the portions of the mask 404 that correspond to a printed mark have a strong similarity to the contaminant 448 in the region 405, the contaminant 448 has a different size and shape than the mask 404. For example, in the configuration 470 the contaminant 448 extends into the peripheral pixels 472 and 474, while an actual mark in the test pattern does not extend to the pixels 427 and 474. The controller 128 applies the mask to identify the locations of mark candidates and to reject some image artifacts in the binary image data. In some situations, an artifact in the image data has a size and shape that closely approximates a mark in the printed test pattern. As described below, during process 200 the controller 128 identifies candidate mark locations that correspond to artifacts in the image data based on the predetermined arrangement of ejectors in the printhead and corresponding locations of marks in the printed test pattern.

Referring again to FIG. 2, process 200 continues as the controller 128 rotates the binary image data to align a maximum number of drop candidates in a row based on the configuration of ejectors in the printhead (block 220). In one embodiment, the controller 128 segments the binary image data into a predetermined number of linear regions that correspond to rows of marks. The number of linear regions and corresponding rows corresponds to the number of rows of ejectors in the printhead 108 and varies for different ejector configurations in different printhead embodiments. The controller 128 identifies the number of mark candidates that are present in each linear segment of the binary image data. The controller 128 compares the number of mark candidates to a predetermined number of mark candidates that are expected for each row of ejectors. The controller 128 rotates the image data to adjust the locations of mark candidates until the numbers of mark candidates in the plurality of rows most closely corresponds to the predetermined number and arrangement of ejectors in the printhead 108.

In one configuration, the controller 128 rotates the image data in an iterative manner to rotate the image data into a position that places the candidate mark locations into rows that most closely correspond to the arrangement of ejectors in the printhead. As noted above, the number of candidate mark locations in one or more of the rows may not exactly match the number of ejectors in the printhead 108 due to the presence of inoperable ejectors or artifacts in the binary image data. The image data and corresponding binary image data of FIG. 3A and FIG. 3B, respectively, depict the marks after completion of a rotation process to align the marks in rows, such as the row 304 and other rows of marks in the printed test pattern 300. In FIG. 3A and FIG. 3B, the rows are arranged parallel to a horizontal ("X") axis, although in alternative embodiments the controller 128 rotates the image data to arrange the mark candidates in parallel with a vertical ("Y") axis.

In some embodiments, the controller 128 omits the image rotation process and identifies rows of mark candidates in the test pattern in linear arrangements that are not parallel with either the X or Y axis in the image data. In other embodiments, the image data rotation process is not required because the ejectors in the printhead and the corresponding marks are already arranged into rows in the binary test pattern without requiring additional image rotation.

Process 200 continues as the controller 128 processes individual rows of marks to identify the locations of marks in the printed test pattern in each row (block 224). The controller 128 first identifies the locations of at least three mark candidates in the linear arrangement of the row with a separation between each mark corresponding to the expected separation of three corresponding ejectors that are arranged in a row of ejectors in the printhead 108. In FIG. 3B, the candidate mark locations that are identified for the marks 316A, 316B, and 316C are an example of a group of marks with "good" spacing that corresponds to the arrangement of ejectors in one row of the printhead 108. The controller 128 begins from the group of mark candidates with the expected spacing along the row and searches for additional candidate locations in the linear region extending from either side of the group of marks to both ends of the row 304. For example, in FIG. 3 the controller identifies the candidate mark location with an expected separation from the mark candidate 316C, and then continues from the location of the candidate mark location 318 to identify additional candidate mark locations toward one end of the row 304.

As described above, an inoperable ejector in the printhead 108 fails to form a mark in the test pattern, and in other situations, the controller 128 misidentifies an artifact in the image data as a mark candidate. During the linear search for additional mark candidates, the controller 128 identifies the locations of missing ejectors and rejects candidate mark locations that correspond to image artifacts based on the relative locations of additional candidate mark locations from the previously identified candidate mark locations. For example, in row 304 the controller 128 identifies that the closest candidate mark location in the linear region extending from the mark candidate 316A is the candidate mark location 331. The separation between the candidate mark location 331 and the candidate mark location 316A is, however, approximately twice the separation that is expected between two adjacent ejectors in one row of the printhead 108. Thus, the controller 128 identifies that the location 324 corresponds to an inoperable ejector in the printhead 108 that failed to form a mark in the location 324. The controller 128 then continues along the linear region from the candidate mark location 331 and identifies two potential candidate mark locations 332 and 336 that are located close together in the row 304. The controller 128 identifies that the candidate mark location 132 corresponds to one mark in the row 304 while the mark location 336 does not correspond to a mark from any of the ejectors in the printhead 108 based in the relative separations between the mark 331 and the candidate mark locations 332 and 336. The controller 128 includes the mark 332 in the row 304 because the separation between the candidate mark location 332 and the previously identified candidate mark location 331 is closer to the expected separation between ejectors in the printhead 108 than the separation between the candidate mark locations 331 and 336.

During process 200, the controller 128 also identifies missing marks that correspond to inoperable ejectors at either a first end or second end of the row of marks (block 228). In one configuration, the controller 128 identifies the total number of mark candidates in the row, including the locations of missing marks, after searching the linear region of the binary image data to both ends of the row. If the number of candidate mark locations is less than the expected number of marks in the row of the printhead, then the controller 128 identifies one or more missing mark locations at either end of the row. In one configuration, the controller 128 selects the appropriate end of the row based on the size of the linear region in the binary image data from the last identified mark in the row. For example, in FIG. 3B the controller 128 identifies the candidate mark location 352 in the row 304, but the binary image data at one end of the row includes a large region without any marks. The controller 128 identifies an inoperable ejector at the end of the row corresponding to the location 354 to account for the missing candidate mark location. Identifying missing jets based on absolute position of the binary image data can be done if the printhead and image module positions are reproducible in the cross-process location. Alternatively, missing jets can be identified by comparing multiple rows. In FIG. 3B, the first dash found in row 304 is aligned with the second dash found in the following row, indicating that there is a missing dash at the beginning of the row.

In some embodiments, in which the material is close in reflectance to the substrate, process 200 continues as the controller 128 identifies inoperable ejectors in the printhead 108 with reference to the identified candidate mark locations and an integrated modal difference process in the image data (block 232). As described above, in some embodiments the process 200 identifies the candidate mark locations for a plurality of marks in a row and locations of missing marks with reference to the binary image data of the row in the printed test pattern. During process 200, the controller 128 uses the identified candidate mark locations from the binary image data to verify the presence or absence of marks in the image data of the printed test pattern. The controller 128 identifies a first sum of reflectance values for at least one pixel at each candidate mark location, identifies a second sum of reflectance values for a predetermined plurality of pixels of the image receiving surface in a region surrounding the candidate mark location.

The controller 128 identifies if the mark candidate corresponds to a printed mark or to an inoperable ejector in response to a difference between the first sum and the second sum being less than a predetermined threshold. For example, as described above the controller 128 uses a mask to identify candidate mark locations. The controller 128 generates a first sum of reflectance values based on the pixels in the mask at the candidate mark location. For a valid mark, the first sum of reflectance values is typically much lower than a corresponding sum of reflectance values for the bare surface of the print medium 144. The controller 128 also identifies a mean or mode of the reflectance values over another region of the print medium 144 with the same number of pixels that are expected to be present in a printed mark to identify an expected reflectance value for the bare image receiving surface. If the absolute value of the difference between the first sum and the second sum exceeds a predetermined threshold, the controller 128 identifies that the candidate mark location includes a printed mark. In some situations, the controller 128 identifies that the candidate mark location does include a printed mark of the marking agent even though binary image data does not indicate the presence of a mark in the candidate location. If, however, the absolute value of the difference between the first and second sums is less than the predetermined threshold, then the pixels at the candidate mark location correspond to the image receiving surface, which indicates an inoperable ejector at the location of the missing mark. In some embodiments, the controller 128 performs a secondary search for another mark in the region around the missing mark location to identify if the inoperable ejector is ejecting drops of the marking agent but is ejecting the drops onto an incorrect location in the test pattern.

Figure 6:
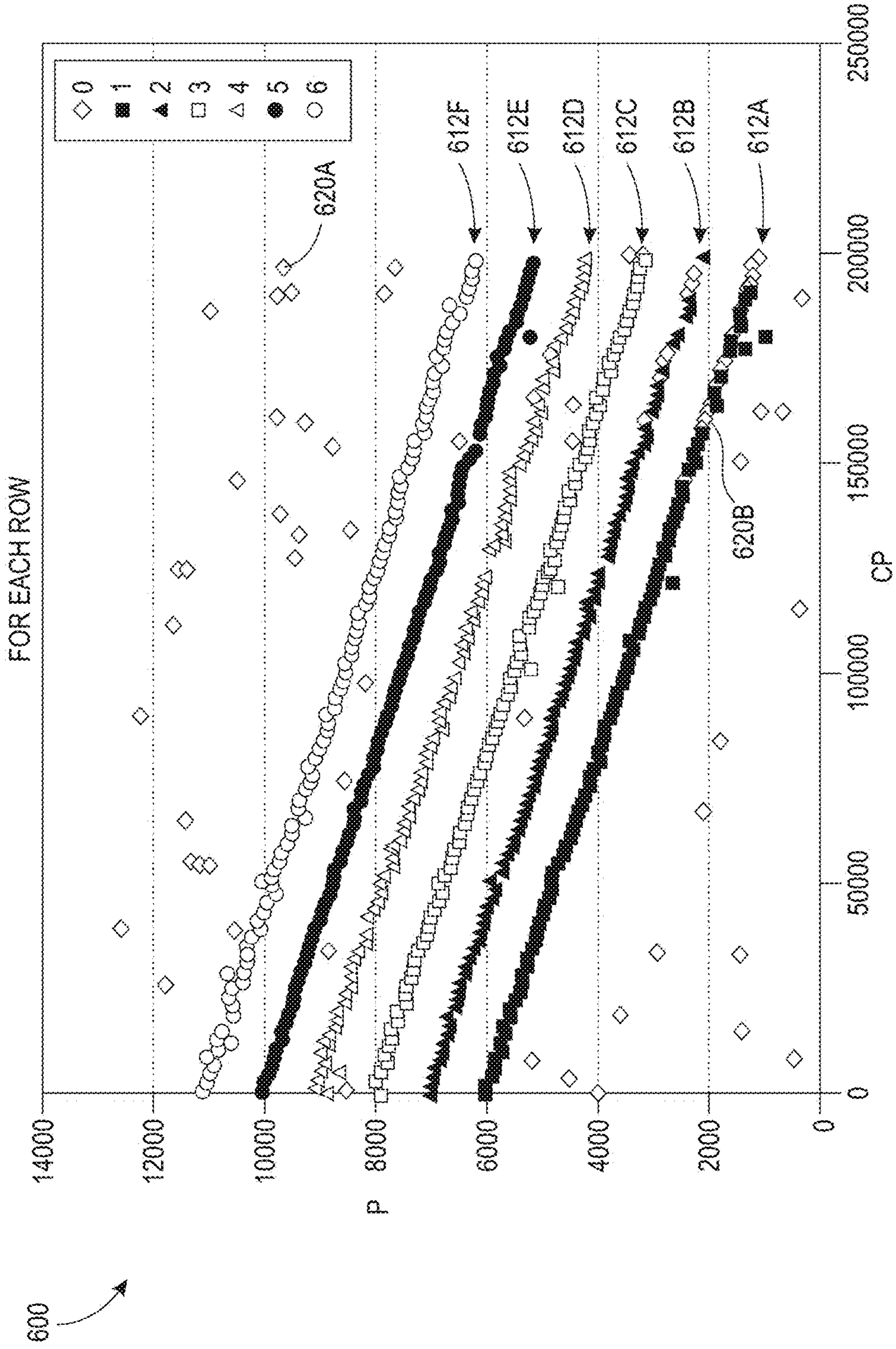
FIG. 6 is a graph depicting the locations of identified marks that are arranged in a plurality of rows in image data of a compact test pattern.

During process 200, the controller 128 performs the processing that is described above with reference to blocks 224-232 for each row of marks in the test pattern. In some embodiments, different rows of ejectors in the printhead 108 eject drops of different sizes, and the controller 128 identifies the candidate mark locations and corresponding marks in each row based on the expected mark size for each row in the printed test pattern. FIG. 6 depicts a graph 600 showing the locations of marks in a set of six rows 612A-612F in a printhead. The printhead includes ejectors that are arranged on a series of diagonal rows relative to the cross-process direction axis CP and the process direction axis P. The graph 600 also includes candidate mark locations that do not belong to any row, including the candidate mark location 620A that is outside of the linear region for any of the rows 612A-612F and the candidate mark location 620B that is within the linear region of the row 612A but is rejected as a mark location during the process 200.

In the printer 100, the controller 128 operates the maintenance unit 142 to perform a maintenance procedure for the printhead 108 if the number of inoperable ejectors exceeds a predetermined upper limit that is acceptable for printing operations (block 236). As described above, in some embodiments the printhead maintenance unit includes a wiper that clears contaminants from the face of the printhead that includes the nozzles of the ejectors. Some printhead embodiments perform a purge operation to force the marking agent through the nozzles in a continuous stream to clear any blocked ejectors and the wiper clears excess marking agent from the face of the printhead. The printhead maintenance unit 142 preforms the maintenance operation to remove blockages in the ejectors and return the inoperable ejectors to working condition. If no ejectors are inoperable, then the controller 128 can omit the printhead maintenance process and return the printhead 108 to operation. If only a small number of ejectors are inoperable, the controller 128 optionally performs an inoperable ejector remediation process to reduce the effects of an inoperable ejector on the production of the three-dimensional printed object 150.

During the process 200, the printer 100 forms the compact test patterns on the print medium roll 144 while the printhead 108 and the print medium roll 144 remain stationary relative to one another to reduce the rate of consumption of the roll 144, which reduces the frequency with which the roll 144 is replaced during operation. Additionally, the printer 100 performs the test pattern image analysis of process 200 to enable the controller 128 to identify inoperable ejectors in a test pattern with marks that occupy a very small region of the print medium roll 144 and for marking agents that include both high and low optical contrast to the image receiving surface.

While the process 200 is described herein in conjunction with the three-dimensional object printer 100 of FIG. 1, alternative printer embodiments may also be suitable for use with the process 200. For example, alternative printer embodiments that include multiple printheads perform the process 200 for each printhead in the printer to identified inoperable ejectors. While the printer 100 includes the printhead maintenance unit 142 with a separate media roll 144 that receives the test pattern, in alternative embodiments the printhead forms the compact printed test pattern on the support member 102 or another image receiving surface in the printer. In addition to three-dimensional object printers, a two-dimensional inkjet printer that forms printed images on paper or other suitable print media uses the process 200 to form compact printed test patterns on a portion of the print medium. The two-dimensional printer generates image data of the compact test pattern and identifies inoperable inkjets in one or more printheads using the process 200.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method of identifying an inoperable ejector in a printhead comprising:

operating with a controller a plurality of ejectors in a printhead to eject drops of a marking agent onto an image receiving surface to form a plurality of marks in a printed test pattern, the printhead and image receiving surface being held in a stationary position with reference to each other during operation of the plurality of ejectors;

operating with the controller an optical sensor to generate image data of the plurality of marks in the printed test pattern on the image receiving surface;

identifying with the controller a plurality of candidate mark locations in the image data;

identifying with the controller a row of printed marks in the image data with reference to a linear arrangement of a portion of the plurality of candidate mark locations, the linear arrangement corresponding to a single row of ejectors in the plurality of ejectors in the printhead;

identifying with the controller an inoperable ejector in the row of ejectors in the printhead in response to an expected location of a mark from the inoperable ejector located along the linear arrangement in the image data not corresponding to any of the identified printed marks; and operating with the controller a printhead maintenance unit in response to identification of the inoperable ejector.

2. The method of claim 1 further comprising:

generating with the controller binary image data corresponding to the image data with reference to a predetermined threshold image data value; and identifying with the controller the plurality of candidate mark locations with reference to the mask and the binary image data, the plurality of candidate mark locations in the binary image data corresponding to the plurality of candidate mark locations in the image data.

3. The method of claim 2 further comprising:

identifying with the controller a first portion of the candidate mark locations with reference to a first mask having a first size corresponding to marks formed by a first portion of the plurality of ejectors in the printhead; and identifying with the controller a second portion of the candidate mark locations with reference to a second mask having a second size corresponding to marks formed by a second portion of the plurality of ejectors in the printhead, the second size being different than the first size.

4. The method of claim 2 further comprising:

generating with the controller a histogram of pixel values in the image data; and identifying with the controller the predetermined threshold image data value with reference to the histogram to generate the binary image data with a predetermined number of pixel values corresponding to an expected number of marks in the image data.

5. The method of claim 2 further comprising:

generating with the controller rotated image data based on the binary image data to arrange the plurality of marks in the test pattern in a plurality of rows along one axis; and identifying with the controller the row of printed marks in the rotated binary image data with reference to the linear arrangement of the portion of the plurality of candidate mark locations arranged along the one axis.

6. The method of claim 2, the identification of the row of printed marks further comprising:

identifying with the controller at least three candidate mark locations in the binary image data in a linear arrangement and a predetermined separation between each candidate mark location corresponding to a predetermined separation between corresponding ejectors in the printhead; and identifying with the controller another candidate mark location in a region of the binary image data extending from the at least three candidate mark locations with the predetermined separation between the other candidate mark location and one of the at least three candidate mark locations.

7. The method of claim 6 further comprising:

identifying with the controller a first candidate mark location and a second candidate mark location within the region of the binary image data extending from the at least three candidate mark locations; and identifying a first distance between the first candidate mark location and an expected location of another mark in the row from one of the at least three candidate mark locations;

identifying a second distance between the second candidate mark location and the expected location of the other mark in the row from the one of the at least three candidate mark locations;

identifying with the controller the row of marks including only the first candidate mark location in response to the first distance being less than the second distance; and identifying with the controller the row of marks including only the second candidate mark location in response to the second distance being less than the first distance.

8. The method of claim 6 further comprising:

identifying with the controller an inoperable ejector located at one end of the row of ejectors in the printhead in response to the row of marks missing one mark at an expected location of the mark in the image data.

9. The method of claim 1, the operation of the plurality of ejectors in the printhead further comprising:

operating with a controller each ejector in the plurality of ejectors to eject a plurality of drops of the marking agent onto the image receiving surface.

10. The method of claim 1, the identification of the inoperable ejector further comprising:

identifying with the controller a first sum of reflectance values for at least one pixel at one candidate location in the row corresponding to the inoperable ejector;

identifying with the controller a second sum of reflectance values for a predetermined plurality of pixels of the image receiving surface in a region surrounding the one candidate location; and identifying the inoperable ejector with the controller in response to a difference between the first sum and the second sum being less than a predetermined threshold.

11. An inkjet printer comprising:

a printhead including a plurality of ejectors configured to eject drops of a marking agent onto an image receiving surface;

an optical sensor configured to generate image data of the image receiving surface;

a printhead maintenance unit; and a controller operatively connected to the printhead, the optical sensor, and the printhead maintenance unit, the controller being configured to:

operate the plurality of ejectors to eject drops of the marking agent onto the image receiving surface to form a plurality of marks in a printed test pattern, the printhead and image receiving surface being held in a stationary position with reference to each other during operation of the plurality of ejectors;

operate the optical sensor to generate image data of the plurality of marks in the printed test pattern on the image receiving surface;

identify a plurality of candidate mark locations in the image data;

identify a row of printed marks in the in the image data with reference to a linear arrangement of a portion of the plurality of candidate mark locations, the linear arrangement corresponding to a single row of ejectors in the plurality of ejectors in the printhead;

identify an inoperable ejector in the row of ejectors in the printhead in response to an expected location of a mark from the inoperable ejector located along the linear arrangement in the image data not corresponding to any of the identified printed marks; and operate the printhead maintenance unit in response to identification of the inoperable ejector.

12. The inkjet printer of claim 11, the controller being further configured to:

generate with the controller binary image data corresponding to the image data with reference to a predetermined threshold image data value; and identify with the controller the plurality of candidate mark locations with reference to the mask and the binary image data, the plurality of candidate mark locations in the binary image data corresponding to the plurality of candidate mark locations in the image data.

13. The inkjet printer of claim 12, the controller being further configured to:

identify with the controller a first portion of the candidate mark locations with reference to a first mask having a first size corresponding to marks formed by a first portion of the plurality of ejectors in the printhead; and identify with the controller a second portion of the candidate mark locations with reference to a second mask having a second size corresponding to marks formed by a second portion of the plurality of ejectors in the printhead, the second size being different than the first size.

14. The inkjet printer of claim 12, the controller being further configured to:

generate with the controller a histogram of pixel values in the image data; and identify with the controller the predetermined threshold image data value with reference to the histogram to generate the binary image data with a predetermined number of pixel values corresponding to an expected number of marks in the image data.

15. The inkjet printer of claim 12, the controller being further configured to:

generate with the controller rotated image data based on the binary image data to arrange the plurality of marks in the test pattern in a plurality of rows along one axis; and identify with the controller the row of printed marks in the in the rotated binary image data with reference to the linear arrangement of the portion of the plurality of candidate mark locations arranged along the one axis.

16. The inkjet printer of claim 12, the controller being further configured to:

identify with the controller at least three candidate mark locations in the binary image data in a linear arrangement and a predetermined separation between each candidate mark location corresponding to a predetermined separation between corresponding ejectors in the printhead; and identify with the controller another candidate mark location in a region of the binary image data extending from the at least three candidate mark locations with the predetermined separation between the other candidate mark location and one of the at least three candidate mark locations.

17. The inkjet printer of claim 16, the controller being further configured to:

identify with the controller a first candidate mark location and a second candidate mark location within the region of the binary image data extending from the at least three candidate mark locations; and identify a first distance between the first candidate mark location and an expected location of another mark in the row from one of the at least three candidate mark locations;

identify a second distance between the second candidate mark location and the expected location of the other mark in the row from the one of the at least three candidate mark locations;

identify with the controller the row of marks including only the first candidate mark location in response to the first distance being less than the second distance; and identify with the controller the row of marks including only the second candidate mark location in response to the second distance being less than the first distance.

18. The inkjet printer of claim 16, the controller being further configured to:

identify with the controller an inoperable ejector located at one end of the row of ejectors in the printhead in response to the row of marks missing one mark at an expected location of the mark in the image data.

19. The inkjet printer of claim 11, the controller being further configured to:

operate with a controller each ejector in the plurality of ejectors to eject a plurality of drops of the marking agent onto the image receiving surface.

20. The inkjet printer of claim 11, the controller being further configured to:

identify with the controller a first sum of reflectance values for at least one pixel at one candidate location in the row corresponding to the inoperable ejector;

identify with the controller a second sum of reflectance values for a predetermined plurality of pixels of the image receiving surface in a region surrounding the one candidate location; and identify the inoperable ejector with the controller in response to a difference between the first sum and the second sum being less than a predetermined threshold.

* * * * *